(12) United States Patent
Yu

(10) Patent No.: US 8,919,875 B2
(45) Date of Patent: Dec. 30, 2014

(54) BASE FOR A BICYCLE SADDLE

(75) Inventor: Tsai-Yun Yu, Taichung (TW)

(73) Assignee: Velo Enterprise Co., Ltd., Taichung (TW)

( * ) Notice: Subject to any disclaimer, the term of this patent is extended or adjusted under 35 U.S.C. 154(b) by 121 days.

(21) Appl. No.: 13/615,923

(22) Filed: Sep. 14, 2012

(65) Prior Publication Data

US 2013/0229037 A1    Sep. 5, 2013

(30) Foreign Application Priority Data

Mar. 5, 2012   (TW) .............................. 101107406 A

(51) Int. Cl.
*B62J 1/00* (2006.01)
(52) U.S. Cl.
USPC ....................................... 297/195.1

(58) Field of Classification Search
USPC .................................. 297/195.1, 201, 215.16
See application file for complete search history.

(56) References Cited

U.S. PATENT DOCUMENTS

| | | | |
|---|---|---|---|
| 6,059,359 A * | 5/2000 | Cassani ...................... 297/195.1 |
| 7,367,619 B2 * | 5/2008 | Fregonese et al. ......... 297/195.1 |
| 7,628,451 B2 * | 12/2009 | Chuang ......................... 297/201 |
| 7,635,162 B2 * | 12/2009 | Ljubich ......................... 297/201 |
| 2009/0189421 A1* | 7/2009 | Yu et al. ..................... 297/195.1 |
| 2010/0019553 A1* | 1/2010 | Yu ................................. 297/214 |
| 2010/0225148 A1* | 9/2010 | Segato ....................... 297/195.1 |
| 2012/0242119 A1* | 9/2012 | Bigolin ...................... 297/195.1 |

* cited by examiner

*Primary Examiner* — Philip Gabler
(74) *Attorney, Agent, or Firm* — Browdy and Neimark, PLLC

(57) ABSTRACT

A base for a bicycle saddle comprises a load-bearing panel body and a rim surrounding the panel body. The rim includes a plurality of sections. One of said sections has a strip-shaped opening so that the section is more flexible than any other place of the rim.

7 Claims, 4 Drawing Sheets

BASE FOR A BICYCLE SADDLE

BACKGROUND OF THE INVENTION

1. Field of the Invention

This invention relates to bicycle saddles and in particular to a load-bearing base for a bicycle saddle.

2. Description of the Related Art

It is well known that a conventional bicycle saddle generally comprises a rigid base, a padding and a cover. The base is made of rigid plastic materials for supporting the body weight of the rider. The padding is usually made of plastic foam materials and applied to the outer surface of the base. The cover, usually leather or cloths, is applied over the padding.

The primary drawback of such a prior art saddle is that the inside thigh areas of the rider, during pedaling, repeatedly contact the side edge of the rigid base, thereby causing periodic rubbing and consequent local irritations. Furthermore, in order to run through steep descents or avoid obstacles, riders would rather have their body only supported at the rear area of the saddle. As a result, the muscles of legs and buttocks of riders would directly contact the outer peripheral edge of the rigid base which thereby creates a localized pressure concentration which adversely affects rider comfort.

For reducing or avoid the drawback of the prior art saddle mentioned above, one possible solution is provided to use additional soft pads, fitted to the outer peripheral edge of the base of the saddle. However, such a solution will render the saddle being too heavy, require particular care in covering the cover to the padding and greatly change the aspect of the saddle.

A main object of this invention is to provide a new base for a bicycle saddle which is adapted to fit the muscles of legs and buttocks, and to provide more comfort during riding without increasing the weight of the saddle.

A further object of the invention is to provide an improved base for a bicycle saddle to which the padding and covering of a bicycle saddle are easily applied.

SUMMARY OF THE INVENTION

These and others objects are achieved by a new base presented hereinafter. The new base for a bicycle saddle according to this present invention is made of rigid or semi-rigid materials. The base comprises a load-bearing panel body and a rim surrounding the panel body. Specifically, the rim is constructed in such a way that one section thereof is constructed to have a strip-shaped opening so that the section is more flexible than any other place of the rim. For having a base with a rim such constructed, the bicycle saddle can fit the muscles of legs and buttocks and provide more comfort during riding without increasing the weight thereof.

In an embodiment, the body has a narrow front portion and a rear wide portion. The rim extends outwardly from the edge of the body. The strip-shaped opening can be disposed on a section of the rim round the narrow front portion or the wide rear portion.

In another embodiment, the rim of the base has an arcuate tip section with one strip-shaped opening extended thereal-ong.

BRIEF DESCRIPTION OF THE DRAWINGS

Further features and advantages of the invention will be more clearly understood from the detailed description of several preferred but non-exclusive embodiments of a support structure according to the invention, which are described by way of non-limiting examples with the aid of the annexed drawing sheets, in which.

DETAILED DESCRIPTION OF PREFERRED EMBODIMENTS

Figure 1:
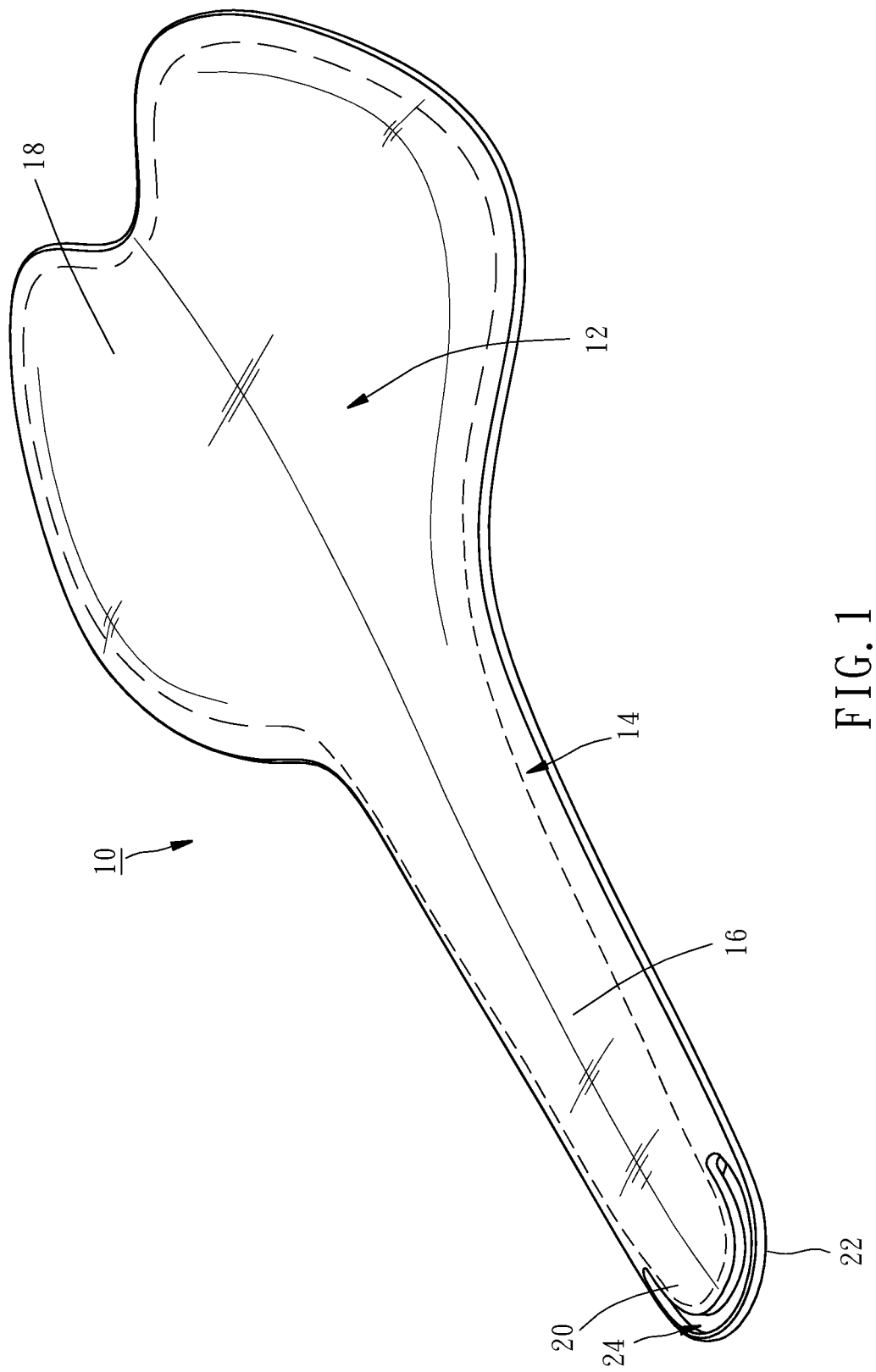
FIG. 1 is a perspective view of a first embodiment of the present invention.
Figure 2:
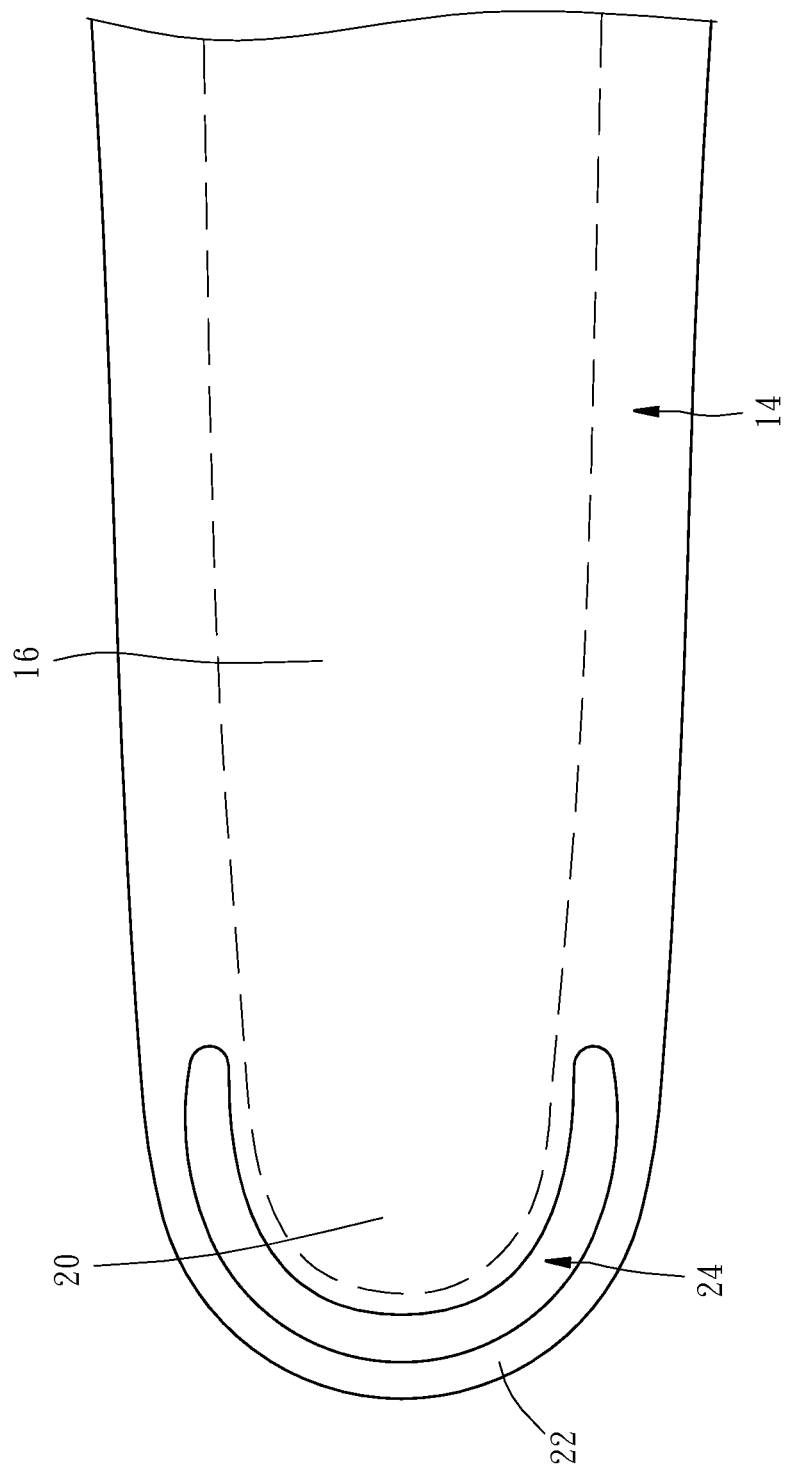
FIG. 2 is a top view of the narrow front portion of the body of the first embodiment.

Referring firstly to FIGS. 1-2, the base 10 for a bicycle saddle is a first embodiment according to the present invention. The base 10 essentially comprises a load-bearing panel body 12 and a rim 14 surrounding the body 12. The body 12 and the rim 14 are integrally made of rigid or semi-rigid materials, such as plastic or fiber-reinforced plastic materials. For easily explaining, as shown in FIG. 1, the body 12 and the rim 14 are marked off by a dotted line.

In this embodiment, the body 12 includes a relatively narrow front portion 16 and a relatively wide rear portion 18. The narrow front portion 16 becomes progressively narrower towards its front end 20 which fits between the crotch of a bicycle rider. The wide rear portion 18 is of a size and shape suitable for supporting the buttocks of a rider. The rim 14 extends outwardly from the edge of the body 12 in a suitable width and includes an arcuate tip section 22 corresponding to the front end 20 of the body 12. A strip-shaped opening 24 is disposed on and along the arcuate tip section 22. Thereby, the section 22 is more flexible than any other place of the rim 14.

Figure 3:
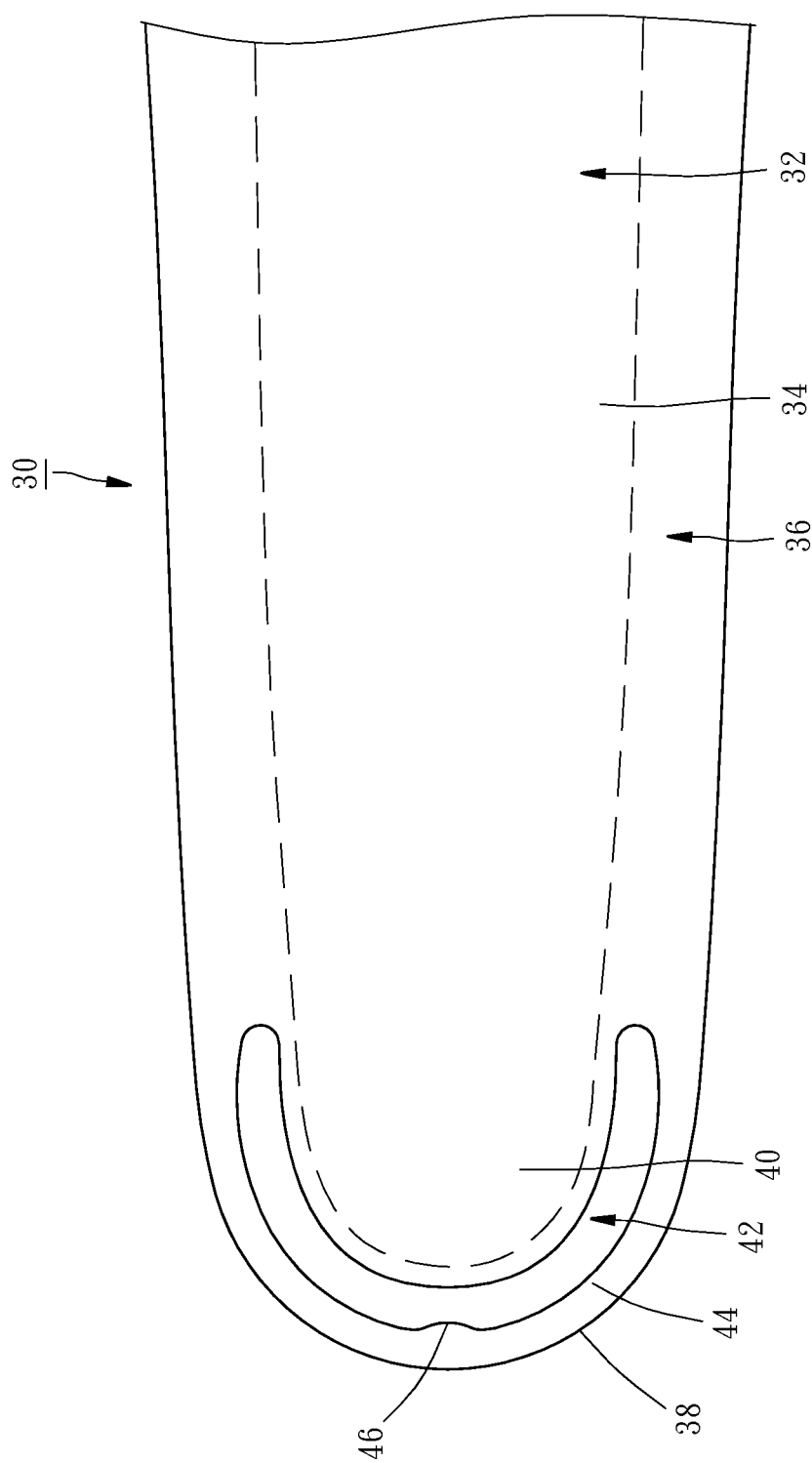
FIG. 3 is a top view of the narrow front portion of the body of a second embodiment.

Referring further to FIG. 3, it shows a base 30 for a bicycle saddle which is a second embodiment according to the present invention. The base 30, being similar to the base 10, includes a body 32 with a front narrow portion 34 and a rim 36 with an arcuate tip section 38 corresponding the front end 40 of the front narrow portion 34. The difference between the base 30 and the base 10 is that disposed on the the arcuate tip section 38 is a strip-shaped opening 42 which defines an outer strip-shaped frame 44 with a center protrusion 46 that faces and extends into opening 42 so that the arcuate tip section 38 of the rim 36 has a suitable flexibility.

Figure 4:
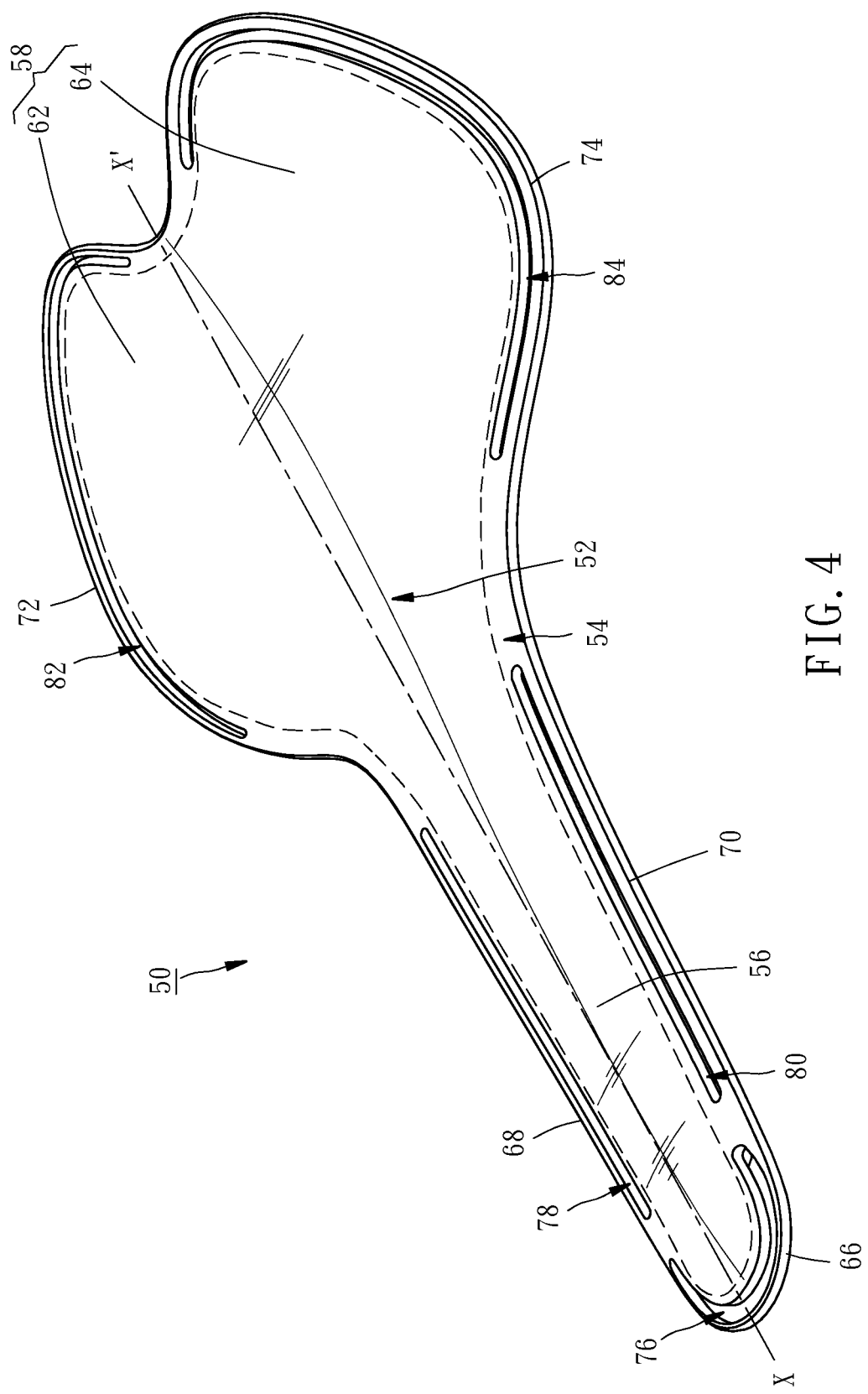
FIG. 4 is a perspective view of a third embodiment of the present invention.

Referring lastly to FIG. 4, reference numeral 50 designates a base according to a third embodiment of the present invention. The base 50 comprises a longitudinal axis X-X', a load-bearing panel body 52 and a rim 54 surrounding the body 52.

The body 52 includes a relatively narrow front portion 56 and a relatively wide rear portion 58. The narrow front portion 56 becomes progressively narrower towards the front end 60 of the body 52. The wide rear portion 58 is divided by the longitudinal axis X-X' of the base 50 into a right load-bearing area 62 and a left load-bearing area 64. The rim 54 extends outwardly from the edge of the body 52 in a suitable width and includes an arcuate tip section 66, disposed on the edge of the front end 60 of said body 52, a right front section 68, and a left front section 70 disposed respectively on the edge of the right side and the left side of said narrow front portion 56 of said body 52, a right rear section 72 disposed on the edge of said right load-bearing area 62, and a left rear section 74 disposed on the edge of said left load-bearing area 64. Disposed on each of the sections 66, 68, 70, 72 and 74 is a strip-shaped opening 76, 78, 80, 82 and 84 so that each of the sections 66, 68, 70, 72 and 74 is more flexible than any other place of the rim 54.

What is claimed is:

1. A base for a bicycle saddle, comprising:

a load-bearing panel body;

a rim surrounding said panel body, the load-bearing panel body and the rim integrally made of rigid or semi-rigid materials;

said rim including a plurality of sections; and one of said sections of said rim having only a single, discrete, strip-shaped opening disposed therein and extending only along a portion of said one of said sections, all other portions of the rim outside of said single, discrete, strip-shaped opening being continuous and uninterrupted, such that an outer strip-shaped frame is defined, said discrete strip-shaped opening extending entirely through the panel body, wherein said portion of said one of said sections having said strip-shaped opening is more flexible than any other portion of said one of said sections of said rim because of said strip-shaped opening;

wherein said body has a narrow front portion and a rear wide portion, and wherein said front narrow portion of said body has a front end, said rim has an arcuate tip section corresponding said front end of said front narrow portion, said single, discrete, strip-shaped opening is disposed on and extends along said arcuate tip section.

2. The base of claim 1, wherein said rim extends outwardly from the edge of said body, said strip-shaped opening is disposed on one section of the rim around said narrow front portion or said wide rear portion.

3. The base of claim 2, wherein said outer strip-shaped frame has a center protrusion that faces said strip-shaped opening.

4. The base of claim 2, wherein said base has a longitudinal axis, said rear wide portion of said body is divided into a right load-bearing area and a left load-bearing area by said longitudinal axis, said rim extends outwardly from the edge of said body; said sections including an arcuate tip section disposed on the edge of the front end of said body, a right front section and a left front section being disposed respectively on the edge of the right side and the left side of said narrow front portion of said body, a right rear section being disposed on the edge of said right load-bearing area, a left rear section being disposed on the edge of said left load-bearing area, each of said sections having at least one said strip-shaped opening.

5. The base of claim 4, wherein said outer strip-shaped frame has a center protruding facing to said strip-shaped opening.

6. The base of claim 1, wherein said outer strip-shaped frame has a center protruding facing to said strip-shaped opening.

7. The base of claim 1, wherein each of said plurality of sections has only a single, discrete, strip-shaped opening extending along only a portion of said section, such that each strip-shaped opening is spaced from a neighboring strip-shaped opening.

* * * * *